Nov. 27, 1951     L. A. RATH     2,576,361
TREE ERADICATOR AND SUBSOILER

Filed July 23, 1947     5 Sheets-Sheet 1

Inventor
Lee A. Rath

By
Kimmel & Crowell    Attorneys

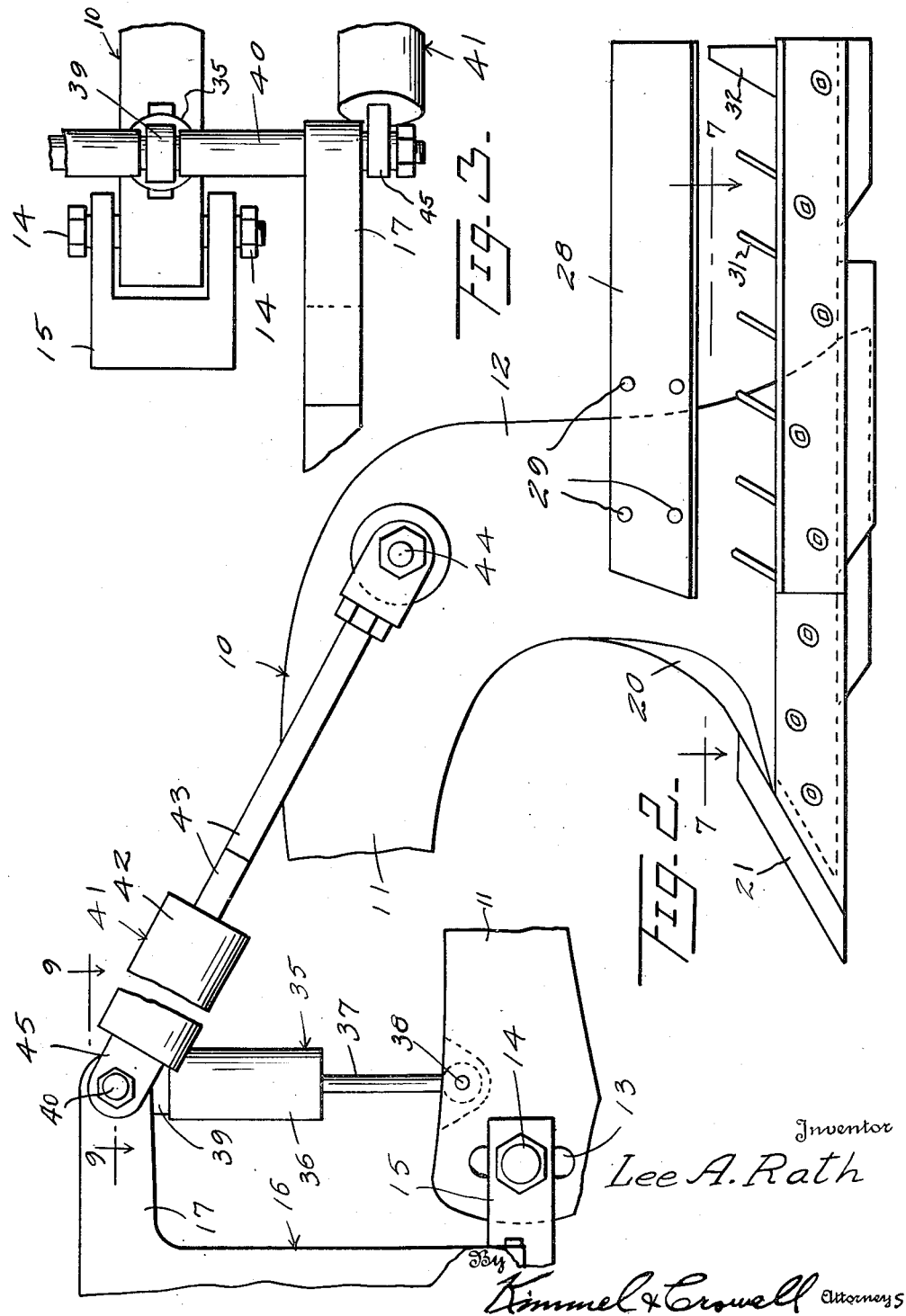

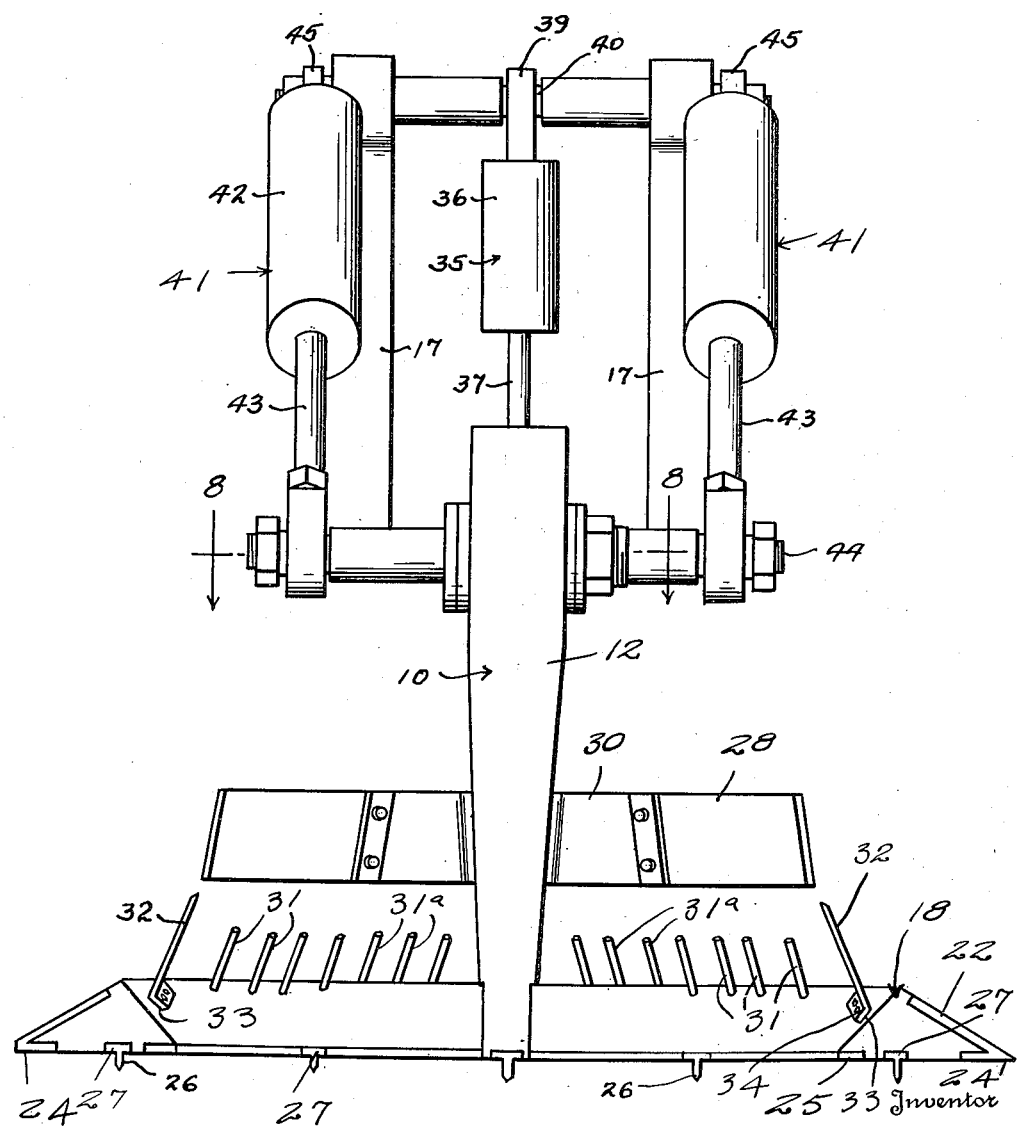

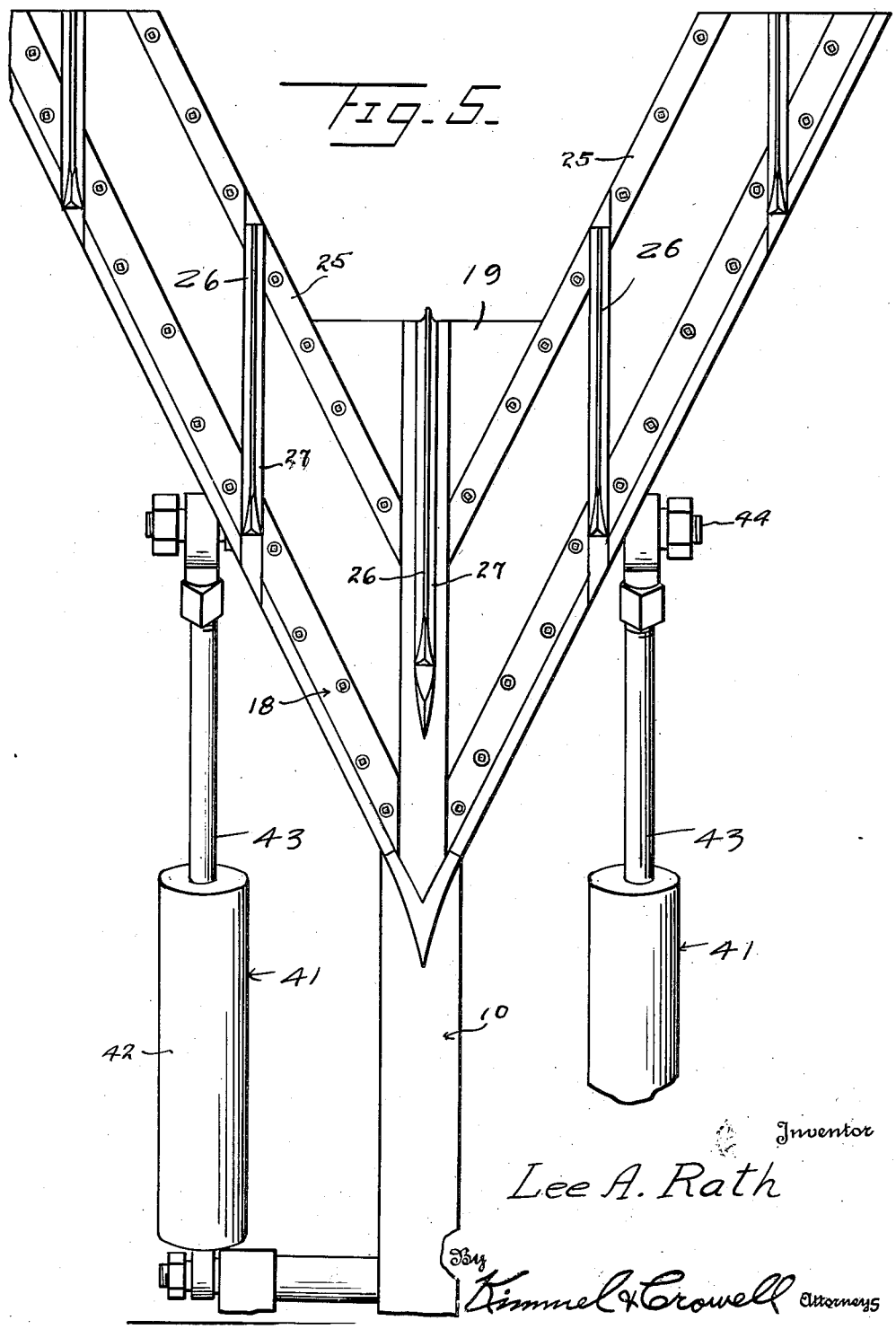

Nov. 27, 1951     L. A. RATH     2,576,361
TREE ERADICATOR AND SUBSOILER
Filed July 23, 1947     5 Sheets-Sheet 5
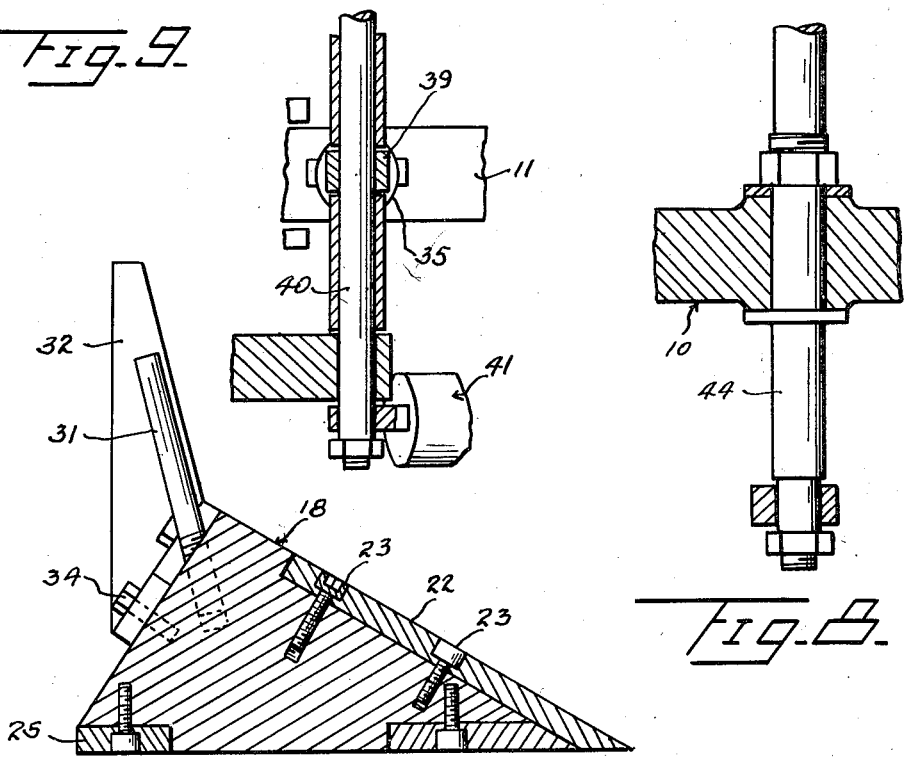
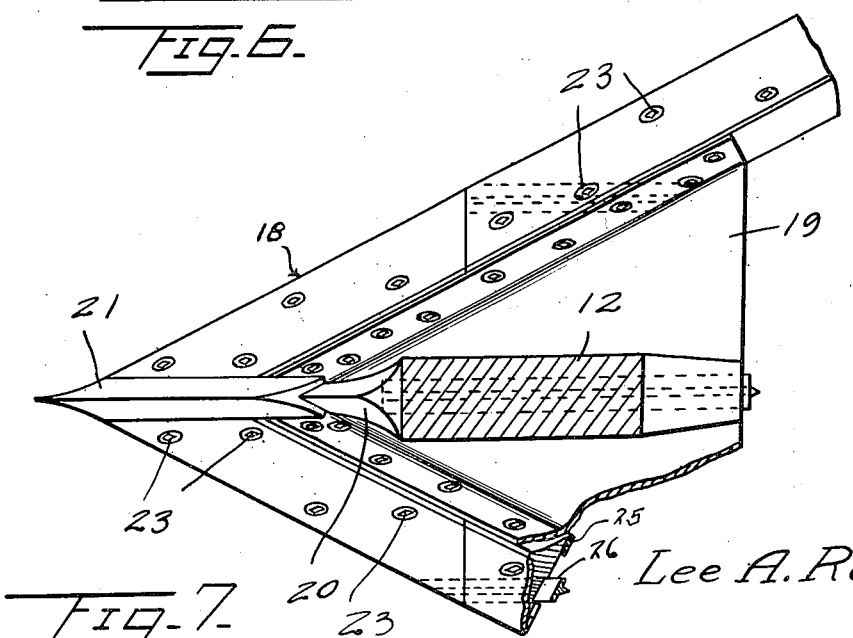
Inventor
Lee A. Rath
By Kimmel & Crowell
Attorneys Patented Nov. 27, 1951

2,576,361

UNITED STATES PATENT OFFICE 2,576,361

TREE ERADICATOR AND SUBSOILER

Lee Allen Rath, Harrold, Tex., assignor of one-third to Vollie John Jones, one-sixth to Frank E. Smith, and one-sixth to N. Alex Bickley, all of Abilene, Tex.

Application July 23, 1947, Serial No. 762,953

1 Claim. (Cl. 97—226.1)

This invention relates to earth working machines.

An object of this invention is to provide a device of this kind which is designed particularly for eradication of trees in prairie land, and for breaking up the hard-pan on the surface of the ground.

Another object of this invention is to provide a device of this kind which will not turn over the ground but will raise the ground from a predetermined depth and break up the raised portion for deposit at the rear of the implement.

A further object of the invention is to provide a device of this kind which is regulated by hydraulic means so that it can be readily adjusted to dig at any predetermined depth.

A further object of this invention is to provide a device of this kind which is so constructed that it can be readily lifted from the ground for turning of the implement at the ends of the rows and can be easily and quickly lowered to the desired depth.

A further object of this invention is to provide a device of this kind including root combs or cutters whereby the roots of trees or the like can be removed from the loosened ground and other roots may be cut.

With the above and such other objects in view as may hereinafter more fully appear, the invention consists of the novel construction, combination and arrangement of parts herein specified, but it is to be understood that changes, variations and modifications may be resorted to which fall within the scope of the invention as claimed.

In the drawings:

Figure 2 is a detail side elevation, partly broken away, of the device.

Figure 3 is a fragmentary plan view of the front portion of the device.

Figure 4 is a detail rear elevation of the device.

Figure 5 is a detail bottom plan, partly broken away, of the device.

Figure 6 is a sectional view taken on the line 6—6 of Figure 1.

Figure 7 is a fragmentary sectional view taken on the line 7—7 of Figure 2.

Figure 8 is a fragmentary sectional view taken on the line 8—8 of Figure 4.

Figure 9 is a fragmentary sectional view taken on the line 9—9 of Figure 2.

Figure 1:
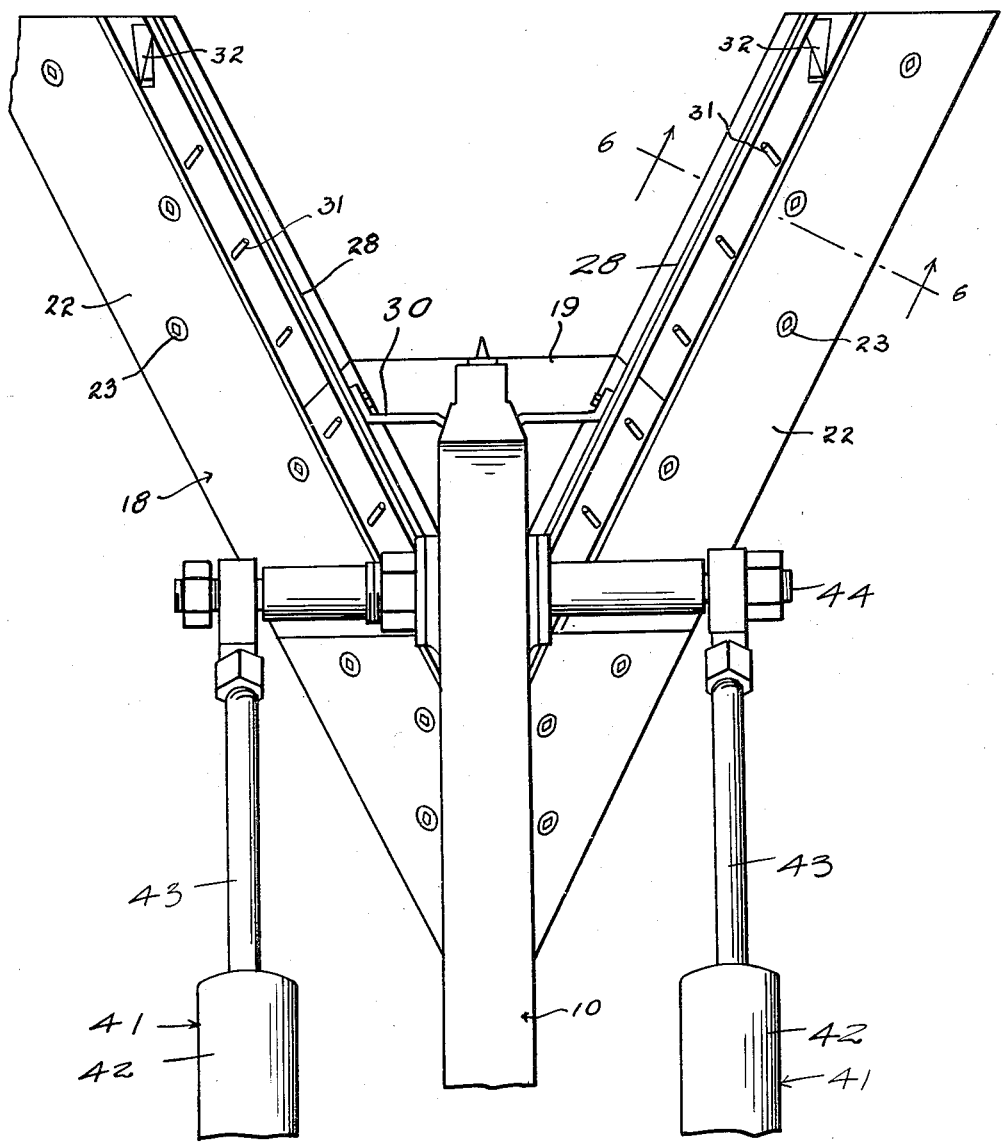
Figure 1 is a detail plan view, partly broken away, of a device constructed according to an embodiment of this invention.

Referring to the drawings the numeral 10 designates generally an elongated beam which includes a substantially horizontal beam portion 11, and a down-turned rear portion 12. The horizontal beam portion 11, at the forward end thereof, is formed with an elongated vertically disposed slot 13 through which a bolt 14, carried by a hitch 15, is adapted to project. The hitch 15 extends rearwardly from a tractor, generally designated as 16, and the tractor 16 also includes a rearwardly extending bracket 17, constructed in the form of a pair of L-shaped members having one side thereof vertical and the other side horizontal, and extending rearwardly of the tractor.

The down-turned rear portion 12 of the beam 10 has fixed thereto a V-shaped member 18. The V-shaped member 18, at the inside of the angle thereof, has fixed thereto a plate 19 to which the lower end of the down-turned beam portion 12 is adapted to be fixedly secured.

The beam portion 12 also includes a relatively keen forward edge portion 20 which extends upwardly from the V-shaped member 18 and forms a cutting edge for cutting any of the tree roots or the like which engage the forward end of the device.

The V-shaped member 18 has fixed to the forward end thereof, a blade 21 forming a point for the plow. The V-shaped member or body 18 has fixed to the opposite rearwardly divergent sides thereof a pair of plates 22 which are secured to the body members or ribs 18 by means of fastening members 23. The plates 22 have extending inwardly from the lower outer edges thereof plates or strips 24 forming runners for the ribs.

The body members or ribs 18 are adapted to have fixed to the inner edges thereof runners or slide members 25. The body members or ribs 18 also have fixed to the lower sides thereof downwardly extending rudders or guide members 26 which are disposed in parallel relation and are also parallel with the length of the beam 10. These runners or guide members 26 include an upper flange 27 which may be secured by any suitable fastening means to the lower sides of the ribs or body members 18. The beam 10 has fixed to the down-turned rear portion 12 thereof a pair of rearwardly divergent window blades 28 which are secured at their forward ends by fastening members 29 to the opposite sides of the beam portion 12.

The bracing member 30 extends between the windrow blades rearwardly of the beam portion 12, for bracing these blades which, as shown in Figure 2, are disposed in upwardly spaced relation to the upper sides of the rib or body members 18.

The rib members 18 also have fixed thereto, a plurality of root combing bars 31. These bars are fixed to the rib members 18, adjacent the upper edge portions thereof, with the bars 18 adjacent the point of the rib members 18 being disposed on the forward sides of the rib members, as indicated at 31a, whereas the remaining root combers are disposed on the rear sides of the ribs 18.

The rib members 18 also have fixed thereto, at the divergent ends thereof, upwardly and inwardly extending root cutting blades 32. The blades 32 are formed at their lower ends with base portions 33 fixed by fastening members 34 to the inner sides of the ribs, as shown in Figure 4.

In order to provide for adjusting the angle of the device I have provided a hydraulic member, generally designated as 35. The hydraulic member 35 includes a cylinder 36, and a piston rod 37 which is connected as at 38 to the forward end of the beam 10 rearwardly of the pivot member 14.

The cylinder 36 includes an ear 39 which which is mounted horizontally on a shaft 40 extending between the two ears or L-shaped members 17. The plow member is also elevated or lowered by means of a pair of hydraulic adjusting members generally designated as 41. The hydraulic members 41 include a cylinder 42 having extending therefrom a piston rod 43 which is connected at its lower rear end to a pin or shaft 44 extending through the rear of the horizontal beam member 11.

The cylinder 42 has extending from the forward end thereof an ear 45 which is loosely mounted on the outer end of the shaft or supporting member 40. The hydraulic members 35 and 41 are adapted to be connected to a suitable source of liquid pressure supply normally provided in a tractor or the like.

In the use and operation of this invention the device is attached to the rear of a tractor with the hydraulic members 35 and 41 connected to the fluid pressure supply. The forward end of the beam 10 loosely engages the coupling member or hitch 15 so that the forward end of the beam can be vertically adjusted to regulate the angle of the plow member. The hydraulic members 41 are adjusted to lower the plow member to the desired point which may be a point where the ribs 18 will engage a slight distance below the surface of the ground. The device is then pulled through the ground breaking up the hard surface as it moves through the ground and as the ground passes over the plow member the root combers 31 and 31a will comb out the roots which are loosened and the blades 32 which have keen forward edges, will cut any roots which are engaged at the outer or rear portions of the wings.

The windrow blades 28 are adapted to move the loosened ground and roots in a wide path where the device extends some distance down into the ground.

When the end of a row is reached the hydraulic members 41 may be operated to raise the device from the ground with the device rocking at its forward end. If desired the device can be adjusted as to the inclination of the wings so that the device will be on a forward and downward inclination or the device may be disposed with the forward end thereof on an upward inclination which will tend to cause the device to ride out of the ground.

The rudders 26 on the bottom of the device will serve as a holding means to keep the device from slipping sidewise as it is pulled along the ground and by providing the two elevating hydraulic members 41 both sides of the beam are braced against lateral twisting or strain.

I claim:

An earth moving implement as set forth comprising an elongated beam adapted to be connected at its forward end to the rear of a tractor, a V-shaped plow member of uniform triangular cross section carried by the rear of said beam, sharpened cutting plates extending the length of the forward edge of the triangular member the full length of both legs of the V, additional plates secured along the full length of the front and rear of the underside of the triangular member, an upwardly and rearwardly extending cutting member carried by the point of said plow member, upwardly and rearwardly extending root combing bars carried by said plow member, certain of said bars being positioned on either side of the apex of said plow member of triangular cross section, upwardly extending root cutting blades carried by the divergent ends of said plow member, a pair of rearwardly divergent windrow blades carried by said beam above said plow member, means securing said windrow blades to said beam, means extending transversely between said windrow blades for bracing the latter, and downwardly extending T-shaped guiding members having the head of the T inset in the lower surface of said plow member, said guiding members providing a plurality of spaced parallel sharp edged blades extending from the lower side of said plow member on each side of the apex thereof and disposed in parallel relation to the length of said beam.

LEE ALLEN RATH.

REFERENCES CITED

The following references are of record in the file of this patent:

UNITED STATES PATENTS

| Number | Name | Date |
|---|---|---|
| 25,464 | Williams | Sept. 13, 1859 |
| 72,852 | Hess | Dec. 31, 1867 |
| 189,637 | Jarrell | Feb. 20, 1877 |
| 1,094,437 | Harris | Apr. 28, 1914 |
| 1,151,884 | Keck | Aug. 31, 1915 |
| 1,164,147 | Tuseth | Dec. 14, 1915 |
| 1,197,081 | Vangold | Sept. 5, 1916 |
| 1,240,758 | Morton | Sept. 18, 1917 |
| 1,329,581 | Colwell et al. | Feb. 3, 1920 |
| 2,424,459 | Hettelsater | July 22, 1947 |